Dec. 2, 1941.   N. JAMES ET AL   2,264,442
PREHEATING GRATE POT
Filed April 11, 1940   2 Sheets-Sheet 1
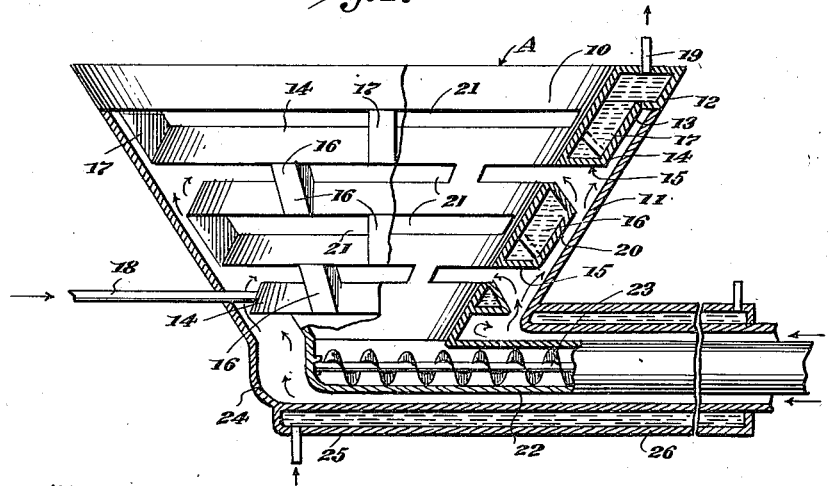
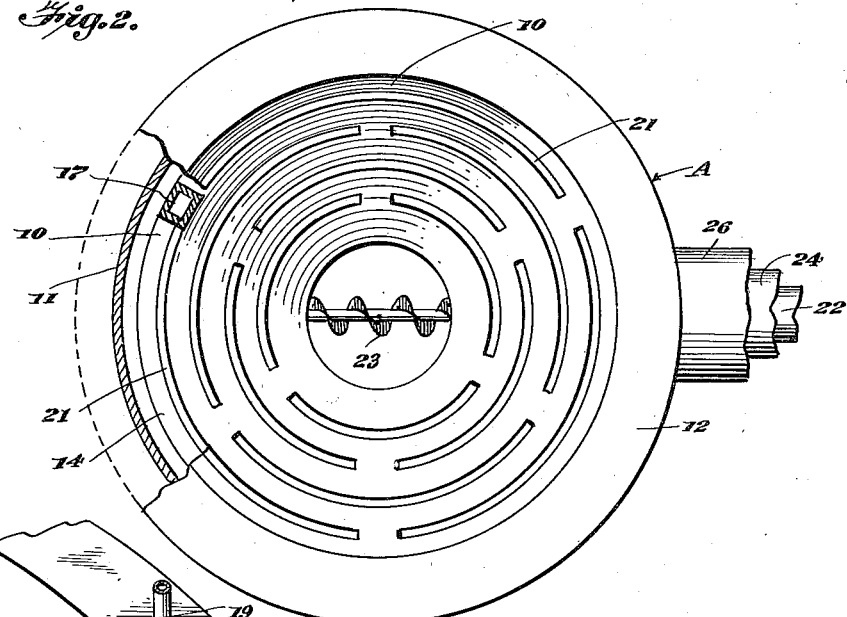
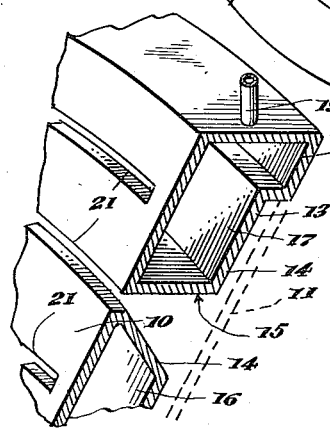
Inventor
NORMAN JAMES
JOSEPH J. ZURENDA, JR.
By Irving R. McCathran
Attorney

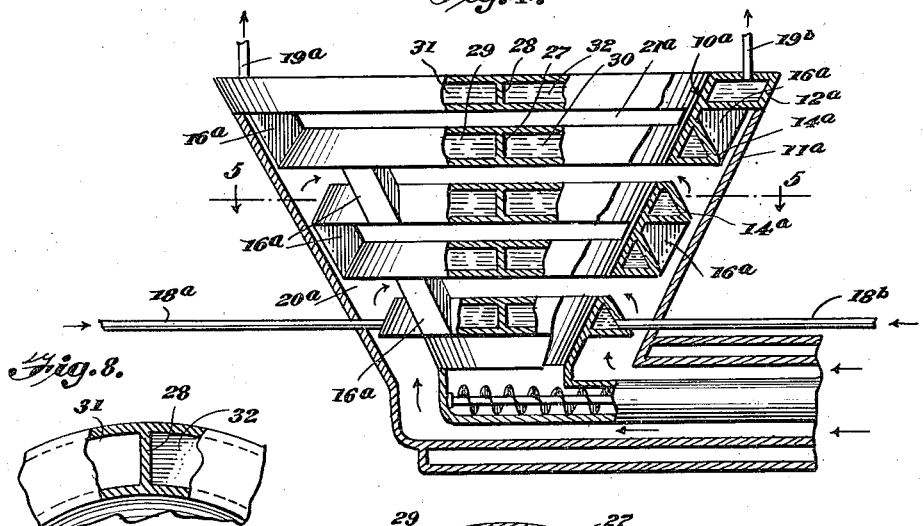
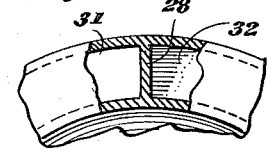
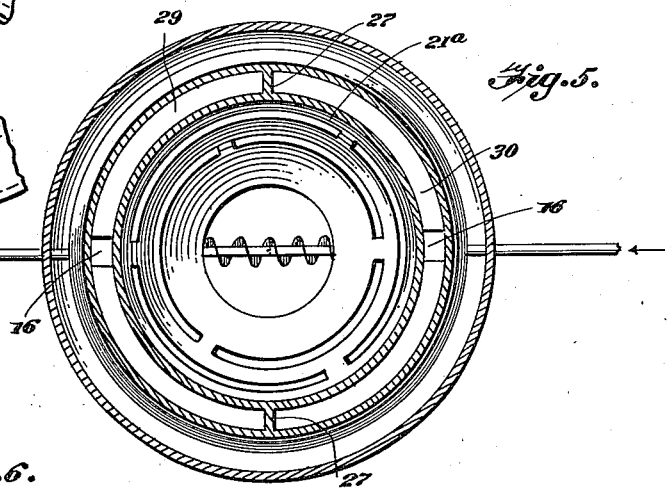
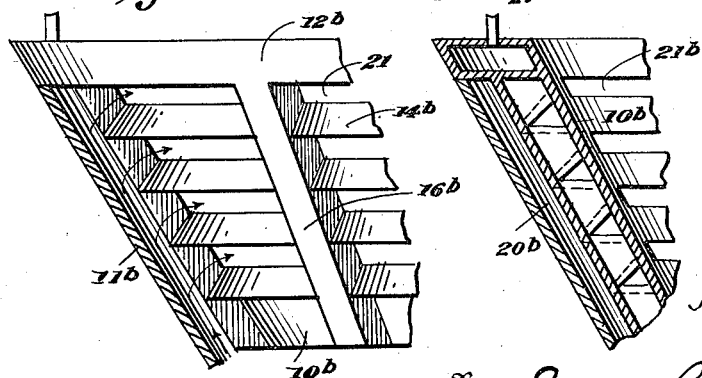

Patented Dec. 2, 1941

2,264,442

UNITED STATES PATENT OFFICE 2,264,442

PREHEATING GRATE POT

Norman James and Joseph J. Zurenda, Jr., Edwardsville, Pa.

Application April 11, 1940, Serial No. 329,142

2 Claims. (Cl. 122—374)

This invention relates to preheating grate pots, for furnaces, boilers and the like, and has for one of its objects the production of a simple and efficient grate pot which is so constructed as to preheat water as it circulates throughout the pot and also to deliver a series of elongated air jets vertically through the bottom of the fire box, to facilitate combustion of the fuel within the fire box.

A further object of this invention is the production of a preheating grate pot which is so constructed as to provide a maximum water heating surface, and also to efficiently direct the air jets vertically through the fire box.

Other objects and advantages of the present invention will appear throughout the following specification and claims.

In the drawings:

Figure 1 is a vertical sectional view through the preheating grate pot;

Figure 2 is a top plan view thereof;

Figure 3 is a fragmentary sectional perspective view of a portion of the pot;

Figure 4 is a vertical section, certain parts being shown in side elevation illustrating a modified type of grate pot wherein a plurality of separate heating chambers are provided;

Figure 5 is a horizontal sectional view taken on line 5—5 of Figure 4;

Figure 6 is a sectional fragmentary perspective view of a further modified form of the invention;

Figure 7 is a fragmentary vertical sectional view of a portion of the type of grate pot shown in Figure 6; and Figure 8 is a fragmentary top plan view of the pot, certain parts being shown in section and portions of the same being drawn together for the purpose of illustrating the dividing partitions in the upper ring.

By referring to the drawings, it will be seen that A designates the grate pot, preferably comprising an inverted cone-shaped structure embodying an inner plate 10 and an outer plate 11. The inner plate 10 is provided with a laterally and outwardly extending circulating hollow ring 12 at the upper end thereof, as shown in Figure 1, the ring 12 preferably being rectangular in cross section, the bottom wall 13 of which extends in a horizontal plane. The inner wall 10 also carries a plurality of spaced annular hollow circulating rings 14 arranged in spaced horizontal relation below the ring 12. Each ring 14 is preferably triangular in shape, the bottom wall 15 of each ring extending in a horizontal plane. The rings 14 are provided with circulation connection tubes 16 by which a complete circulation between the rings is maintained from the bottom to the top of the pot A. The upper ring 14 is likewise connected to the ring 12 by communicating circulation connection tubes 17. These tubes 16 and 17 are all arranged in staggered relation as shown in Figure 1, to facilitate circulation. An inlet pipe 18 is connected to the lower ring 14 and an outlet pipe 19 is connected to the ring 12, and this pipe 19 may extend to a boiler, tank or other receptacle to receive the preheated water passing from the pot A.

The outer plate 11 is arranged in spaced relation to the inner plate 10 and also to the outer edges of the rings 14, the upper edge of the plate 11 being secured to the under face of the ring 12 near the outer edge thereof. This arrangement provides an air circulating chamber 20. Air jet slots 21 are arranged in the inner plate 10 in horizontal relation between the rings 14 and also between the upper ring 14 and the ring 12, the slots between the respective rings being preferably arranged in staggered relation, as shown in Figures 1 and 2. The lower end of the inner wall is supported by a fuel supply tube 22, in which is mounted a conveyor 23 for conveying fuel to the lower end of the pot A. The lower end of the outer plate 11 is carried by a casing 24 and may form an integral part thereof. The casing 24 is spaced from the tube 22 to provide an air conduit 25 leading to the air chamber 20. A water jacket 26 may be provided around the casing 24, as shown in Figure 1.

The operation of the device is as follows:

The fuel will be fed to the bottom end of the pot A through the medium of the conveyor 23 and will be forced upwardly through the pot. Water will enter the pipe 18 and will be circulated through the rings 14 and pass out through the ring 12 and the pipe 19 as previously described. The various parts may be cast or welded into an integral structure and it should be understood that the outer plate or wall 11 is spaced from the inner plate or wall 10 and that the rings 14 are arranged in graduated spaced relation to the outer plate 11, the lower ring 14 being a greater distance from the outer plate 11 than the upper ring 14 to facilitate the passage of the air from the conduit 25 upwardly. The air will pass upwardly and strike against the horizontal walls 15 of the rings 14 and then will be forced out through the elongated jet openings 21, in this way forcing elongated horizontally extending jets of air upwardly through the fire box. These slots 21 are preferably small and because of the constant blast of air passing therethrough the dust from the ashes will not clog these slots, but the dust will be forced upwardly and out of the slots, the clinkers or hard part of the ashes spanning the openings and supporting the fire away from the openings and in this way combustion wil be facilitated.

As shown in Figures 4 and 5, a grate pot is illustrated having an inner wall 10a and an outer wall 11a similar to the structure shown in Figure 1, to provide an air chamber 20a. The inner wall 10a carries a plurality of water circulating rings 14a similar to the rings 14, which rings 14a are arranged in spaced relation and are provided with communicating tubes 16a similar to the tubes 16. An upper ring 12a similar to the ring 12 is also provided. Each ring 14a is hollow and is provided with central partitions 27, the partitions of the rings 14a being arranged in vertical alignment and the ring 12a is also provided with central partitions 28, which central partitions 28 are in vertical alignment with the partitions 27. These partitions 27 will provide a circulating compartment 29 upon one side of the center of the pot which may be used for preheating water passing to a boiler and a compartment 30 upon the other side of the center of the pot which compartment 30 may be used for heating a hot water supply which may be used such for instance as for domestic use. The partitions 28 divide the upper ring 12a into compartments 31 and 32 for a similar purpose. The compartment 29 is provided with a water supply pipe 18a and the compartment 31 is provided with a water outlet pipe 19a. The compartment 30 is provided with an inlet pipe 18b and the compartment 32 is provided with an outlet pipe 19b. The compartments 31 and 32 are provided with communication tubes which communicate with the next adjoining ring 14a, as shown in Figure 4. A similar means for supplying fuel and air to the various parts is provided in the structure shown in Figure 4, this structure being similar to that shown in Figure 1. A plurality of air ports 21a are arranged in the inner plate 10a in spaced relation and between the rings 14a.

In Figures 6 and 7 there is shown a further modified type of the invention wherein an outer plate 11b is provided in spaced relation to the inner plate 10b to provide an air chamber 20b. A plurality of horizontally disposed spaced water circulating rings 14b are provided which are secured to the inner plate 10b within the chamber 20b. These rings 14b communicate with the vertically extending water supply conduits 16b, as shown in Figure 6. These conduits 16b also communicate with the upper ring 12b similar to the ring 12. The inner wall 10b is provided with air jet ports 21b similar to those shown in Figure 1.

Having described the invention, what we claim is:

1. A preheating grate pot of the class described comprising a substantially inverted cone-like body constituting a fire box having a fuel entrance opening at its lower end, the body comprising an inner plate and an outer plate spaced from the inner plate to provide an air chamber, a plurality of spaced horizontal hollow water circulating rings carried by the inner plate within the air chamber and arranged one above the other to provide an inverted cone, means for supplying water to the lower ring, hollow circulation connection tubes connecting the rings to provide a unitary grate pot, said connection tubes providing communicating means between the rings, the hollow rings and hollow circulation connection tubes providing means by which water may contact the inner faces of the rings and throughout the entire length of the connection tubes of the grate pot, outlet means for the upper ring, the inner plate having a plurality of air ports formed between the rings, and means for supplying an air blast to the air chamber for forcing air jets out through the air ports into the fire box of the inverted cone-like body to facilitate combustion.

2. A preheating grate pot of the class described comprising a substantially inverted cone-like body constituting a fire box having a fuel entrance opening at its lower end, the body comprising an inner plate and an outer plate spaced from the inner plate to provide an air chamber, a plurality of horizontal hollow water circulating rings carried by the inner plate within the air chamber one above the other and arranged to provide an inverted cone, means for supplying water to the lower ring, hollow circulation connection tubes connecting the rings and supporting said rings one above the other to provide said inverted dome-like body, said connecting tubes also providing communicating means between the rings, outlet means for the upper ring, the inner plate having a plurality of air ports formed between the rings, means for supplying an air blast to the air chamber for forcing air jets out through the air ports into the fire box of the inverted cone-like body to facilitate combustion, the outer plate being spaced from the outer edges of the rings to permit the air to freely circulate upwardly between the rings, each ring having a horizontal bottom wall located adjacent the air ports for deflecting the air through the ports as the air passes upwardly through the air chamber.

NORMAN JAMES.
JOSEPH J. ZURENDA, Jr.